United States Patent
Kim et al.

(10) Patent No.: US 9,624,357 B2
(45) Date of Patent: Apr. 18, 2017

(54) POLYCYCLOHEXYLENEDIMETHYLENE TEREPHTHALATE RESIN COMPOSITION WITH HIGH COLOR RESISTANCE AND HEAT RESISTANCE COMPRISING A NON-HALOGEN FLAME RETARDANT AND A NON-HALOGEN FLAME RETARDANT AID

(71) Applicant: Research & Business Foundation Sungkyunkwan University, Suwon-si (KR)

(72) Inventors: Jin Hwan Kim, Seoul (KR); Soo Jung Kang, Anyang-si (KR); Hai Yan An, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 14/686,302

(22) Filed: Apr. 14, 2015

(65) Prior Publication Data

US 2015/0299429 A1   Oct. 22, 2015

(30) Foreign Application Priority Data

Apr. 17, 2014  (KR) .................. 10-2014-0046003

(51) Int. Cl.
   *C08K 5/5333*   (2006.01)
   *C08K 5/5313*   (2006.01)
   *C08L 67/02*    (2006.01)
   *C08K 5/52*     (2006.01)
   *C08K 7/14*     (2006.01)
   *C08K 5/5317*   (2006.01)

(52) U.S. Cl.
   CPC .............. *C08K 5/52* (2013.01); *C08K 5/5313* (2013.01); *C08K 5/5317* (2013.01); *C08K 5/5333* (2013.01); *C08K 7/14* (2013.01)

(58) Field of Classification Search
   CPC .. C08G 63/199; C08K 5/5317; C08K 5/5333; C08K 5/5357; C08K 5/527; C08L 67/02; C08L 67/06
   See application file for complete search history.

(56) References Cited

U.S. PATENT DOCUMENTS

| | | | | |
|---|---|---|---|---|
| 5,656,715 A | * | 8/1997 | Dickerson ............ | C08G 63/199 528/271 |
| 6,716,899 B1 | * | 4/2004 | Klatt .................... | C08K 5/5313 524/126 |
| 2014/0009962 A1 | * | 1/2014 | Kang ................... | G02B 6/0011 362/612 |

FOREIGN PATENT DOCUMENTS

| | | | |
|---|---|---|---|
| CN | 102585449 A | * 7/2012 | |
| JP | 10-204276 A | 8/1998 | |
| JP | 2007-119645 A | 5/2007 | |
| JP | 2009-132935 A | 6/2009 | |
| KR | 10-2007-0064924 A | 6/2007 | |
| KR | 10-2014-0028566 A | 3/2014 | |
| KR | 10-2014-0034063 A | 3/2014 | |
| WO | WO 9741173 A1 | * 11/1997 | ........... C08K 5/0066 |

OTHER PUBLICATIONS

Peng, H-Q; Zhou, Q.; Wang, D-Y.; Chen, L.; Wang, Y-Z. A novel charring agent containing caged bicyclic phosphate and its application in intumescent flame retardant polypropylene systems. Journal of Industrial and Engineering Chemistry, 2008, vol. 14, pp. 589-595.*
Rosato, D. V.; Rosato, D. V.; Rosato, M. G. Injection Molding Handbook. Springer Science+Business Media New York. 2000. pp. 527-530.*
Machine Translation of CN102585449A. Jul. 18, 2012.*
Chen, L.; Wang, Y-Z. Aryl polyphosphonates: Useful halogen-free flame retardants for polymers. Materials. 2010, vol. 3, pp. 4746-4760.*
Korean Notice of Allowance received in counterpart Korean Application No. 10-2014-0046003 on Nov. 27, 2015 (2 pages in Korean).

* cited by examiner

*Primary Examiner* — Robert C Boyle
*Assistant Examiner* — Stephen Rieth
(74) *Attorney, Agent, or Firm* — NSIP Law

(57) ABSTRACT

The present invention relates to a polycyclohexylene-dimethylene terephthalate resin composition, more specifically to an economical, high color-resistant, flame-retardant polycyclohexylene-dimethylene terephthalate resin composition containing a non-halogen flame retardant aid, bis(2,6,7-trioxa-1-phosphabicyclo[2.2.2]octane-1-oxo-4-hydroxymethyl) phenylphosphonate. Further, a flame-retardant molded article using features of a resin composition according to the present invention may be used as various electrical and electronic components including display or automobile parts.

18 Claims, No Drawings

POLYCYCLOHEXYLENEDIMETHYLENE TEREPHTHALATE RESIN COMPOSITION WITH HIGH COLOR RESISTANCE AND HEAT RESISTANCE COMPRISING A NON-HALOGEN FLAME RETARDANT AND A NON-HALOGEN FLAME RETARDANT AID

BACKGROUND OF THE INVENTION

1. Field of Invention

The present invention relates to a polycyclohexylenedimethylene terephthalate resin composition, and more specifically to an economical, high color-resistant, flame-retardant polycyclohexylenedimethylene terephthalate resin composition containing a non-halogen flame retardant aid, bis(2,6,7-trioxa-1-phosphabicyclo[2.2.2]octane-1-oxo-4-hydroxymethyl)phenylphosphonate.

2. Description of the Related Art

As needs for high heat-resistant materials are recently increasing, necessity is heightened for engineering plastic with heat resistance of continuous duty temperature of 250° C. or higher while satisfying moldability suitable for producing electronic materials and automobile parts with complex shapes. Especially, thermoplastic resins having high heat resistance are needed as the core component materials of the high-tech industry of the next generation, such as displays, solar cells, flexible plastic materials for electronic paper, materials for space industry, other electronics/semiconductors, etc. To be used in displays and flexible plastic materials for solar cells, polymer materials having high heat resistance with the glass transition temperature of 330° C. or higher, as well as high transparency, low hygroscopic property, and low shrinkage property are needed. However, such novel materials still have not been developed yet.

To ensure heat resistance of a polymer, a molecular structure which is very stable against heat should be constituted by introducing an aromatic group. However, the development is hindered by low transparency due to interactions between aromatic polymer chains, optical anisotropy, an innately high coefficient of expansion of an organic polymer, etc.

Recently, super engineering plastics which may replace poly(ether ether ketone) (PPEK), which has satisfying heat resistance but bad moldability, are being developed. Representative polymers include: i) polyamide-based PA46 (Stanyl, DSM), polyphthalamide (PPA) (or PA6T or Nylon6T; representative products include Zytel HTN®, Amodel®, and) Grivory®), and PA9T (or Nylon9T®; Genestar); ii) a wholly aromatic polyester-based display polymer (liquid crystalline polymer (LCP); representative products include Xydar® and Sumikasuper®); and iii) polyester-based polycyclohexylenedimethylene terephthalate (PCT; representative products includes Thermx® of DuPont) induced from alicyclic monomers.

PCT, amongst all, has a crystallization rate slower than that of polybutylene terephthalate (PBT) but faster than that of polyethylene terephthalate (PET), exhibits high heat resistance, and enables an injection molding. Further, due to the relatively high cost competitiveness, PCT has high potential applicability. Furthermore, PCT is a polymer having the highest melting point amongst existing polyester-based polymers except liquid crystal polymers, and exhibits low water absorption and excellent color resistance against heat compared to other polyamide-based polymers.

Generally, thermoplastic resins such as polycyclohexylenedimethylene terephthalate (PCT) resins, etc., are applied in numerous products due to their excellent processability and mechanical features. However, since thermoplastic resins are not innately resistant to fire, it has been regulated by law to only use polymer resins which satisfy flame resistance standards throughout the world. Therefore, flame retardants are compounded in resins to provide flame retardancy in thermoplastic resins. Examples of the conventional flame retardants are halogen-based flame retardants, polyphosphoric acid-based flame retardants (inorganic phosphorus-based flame retardants) such as red phosphorus, ammonium polyphosphate, etc., organic phosphorus-based flame retardants represented by triaryl phosphorus ester compounds, and metal hydroxides. Representative examples of flame retardant aids used in combination with the flame retardants are antimony oxides, melanin compounds, etc.

Typically, flame retardancy is incorporated in thermoplastic resins by compounding halogen-based flame retardants with antimony oxide ($Sb_2O_3$) as a flame retardant aid. However, although the halogen-based flame retardants (organic halogen-based flame retardants and halogen-containing organic phosphorus flame retardants) are widely used due to their excellent flame-retardancy the halogen-based compounds can be volatilized and produce halogenated hydrogen gas during processing, thereby causing metal corrosions. Also, gas produced during combustion is problematic as it is harmful to human body. According to the regulation of harmful substances such as RoHS and PoHS along with the materials described above, various regulations are imposed to limit the usage of products containing halogen-based compounds as electrical and electronic components. Therefore, there is a rapidly increasing need for resins containing non-halogen-based flame retardants.

A flame retardation technology for polymer resins including inorganic compounds such as magnesium hydroxide, aluminum hydroxide, etc., as flame retardants using non-halogen-based compounds is suggested. JP Patent Application Publication No. 1998-204276 suggests a method of adding a flame retardant to resins by mixing aluminum hydroxide (ATH), at least one nitrogen compound and red phosphorus, and adding to unsaturated polyester resins. However, the necessity of use of aluminum hydroxide in large quantity results in deterioration of mechanical properties of a resin composition. Further, KR Patent Application Publication No. 2007-0064924, describes a flame retardation technology of acrylonitrile-butadiene-styrene copolymer resins (ABS resins), but it is not environment-friendly since the used flame retardant a bromine-based organic compound.

Meanwhile, flame retardants are considered as comparably expensive compounds, and thus to produce more economical resin compounds, numerous research has been conducted to develop flame retardant aids which could maintain or enhance flame retardancy while reducing the content of flame retardants. However, it is not easy to determine the optimal flame retardant aid and the appropriate content thereof.

SUMMARY OF THE INVENTION

The objective of the present invention is to provide an economical, environment-friendly polycyclohexylenedimethylene terephthalate resin composition with enhanced heat resistance and color resistance by adding a flame retardant aid, bis(2,6,7-trioxa-1-phosphabicyclo[2.2.2]octane-1-oxo-4-hydroxymethyl)phenylphosphonate to polycyclohexylenedimethylene terephthalate resins.

Another objective of the present invention is to provide a flame-retardant molded article using the resin composition.

DESCRIPTION OF THE PREFERRED EMBODIMENTS

The first aspect of the present invention provides (a) polycyclohexylenedimethylene terephthalate resins; (b) a flame retardant; and (c) a polycyclohexylenedimethylene terephthalate resin composition including a flame retardant aid represented by Formula 1 as follows:

[Formula 1]

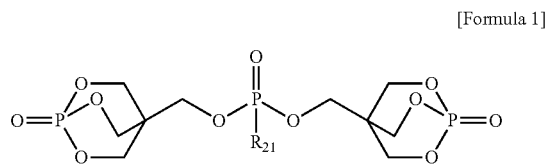

wherein $R_{21}$ is a $C_1$ to $C_6$ linear or branched alkyl group, a $C_3$-$C_6$ cyclic alkyl group, or a $C_6$ to $C_{10}$ aryl group.

Also, the second aspect of the present invention provides a flame-retardant molded article using the polycyclohexylenedimethylene terephthalate resin composition according to the first aspect.

Hereinafter, the present invention will be described in greater details.

Generally, because organic polymer resins are susceptible to heat, in the presence of an ignition source, polymer chains become decomposed by heat and produce a large amount of gas. The resulting decomposed substances react with oxygen and become combusted. Heat produced from the combustion again decomposes polymers, thereby causing a chain reaction of continuous combustions and producing high heat of combustion along with much smoke.

Approaches to flame retardation of organic polymers include a method of controlling combustion by isolating flammable gas or oxygen, a method of inhibiting production of decomposition gas by freezing the condensed phase to delay secondary decomposition speed or by blocking heat transfer routes via formation of insulating layer on the surface of polymers which undergo combustion, a method of capturing radicals which serve as the cause of combustion, a method of separating parts which undergo combustion from a heat source, etc.

Flame retardants can be classified into additive flame retardants and reactive flame retardants. Additive flame retardants are used by simply mixing in as an additive during compounding processes, while reactive flame retardants produce flame-retardant polymers by introducing a monomer capable of incorporating flame retardancy in the main chain of a polymer or incorporating flame retardancy by introducing a reactive group into a polymer and chemically binding a flame-retardant substance to a terminal or side chain of a polymer.

There are differences in mechanisms with respect to types of flame retardants. Halogen-based compounds have an advantage of incorporating excellent flame retardancy irrespective of types of resins in application. When halogen-based flame retardants are used, flame retardancy are exhibited mostly in the gas phase, thus flame retardation is easily accomplished irrespective of types of resins. However, due to disputes on harmful effects on the environment, electrical and electronic product set makers have active interests in applying non-halogen resins as a marketing strategy, and thus non-halogen flame retardation is promoted regarding resins which are largely applied as exterior materials.

Phosphorus-based flame retardants are gaining attention as a non-halogen-based flame-retardant system to resolve environmental problems. Phosphorus-containing compounds in applications include red phosphorus, phosphagen, phosphate-based compounds, etc. Due to a possibility of having phosphine ($PH_3$), known as a toxic agent, produced during processing, red phosphorus which has undergone surface treatment is used. Also, due to color problems, red phosphorus is limitedly applied as interior components using nylon and PBT resins. Typical phosphorus-based flame retardants are phosphate compounds. Although the processing of flame-retardant resins is facilitated, and compatibility and durability are good, because of the stable chemical structure and effects of incorporating plasticity, there exists a drawback of reduced heat resistance.

The main mechanisms of phosphorus-based flame retardation are i) dehydration and carbonization resulting from phosphoric acids produced by pyrolysis; and ii) capture of hydrogen of phosphorus-containing radicals and hydroxy radicals. Phosphorus-based flame retardants can act simultaneously both in a condensed phase and a gas phase. During high-temperature combustion, phosphorus-based flame retardants exhibit flame-retardant effects mainly to polymers which easily form char.

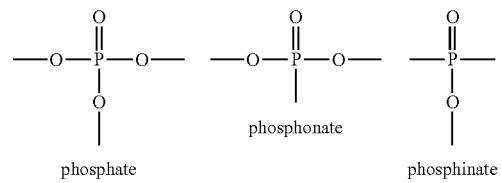

phosphate     phosphonate     phosphinate

Phosphonate- or phosphinate-based flame retardants do not require large quantities for application compared to phosphate-based flame retardants, and are advantageous as to flame-retardant efficiency since they may contain higher phosphate contents compared to phosphate-based flame retardants. However, because phosphonate- or phosphinate-based flame retardants structurally have high polarity, they are often water soluble when their molecular weights are not high. Therefore, they have limitation in being applied as flame retardants for organic polymer resins and require higher production costs compared to phosphate.

Meanwhile, compounds which are favorable to the environment do not exist. To solve the current problem that flame retardants should be used in a large quantity, it is needed to effectively accomplish flame retardation in a small quantity.

Because flame retardancy differs with respect to structures of a flame retardant and polymers to which a flame retardant is applied, and resin combustion behaviors and decomposition behaviors take actions in complexity, it is difficult to predict flame retardancy without actual examination. Determining which flame-retardant organization acts mainly on flame retardation depends on used flame retardants, types of resins in application, and types of additives. Two or more flame retardants may be applied in combination and depending on the flame-retardant organization in action, synergistic, additive, antagonistic, etc., effects may be exerted. Further, depending on types of resins, flame-retardant effects may not be present at all.

Because thermal or mechanical properties of resins may be reduced by flame retardants added in resins, it is generally important to minimize property loss as well as securing sufficient flame retardancy. Further, it is needed to develop flame retardants according to requirements of the final usage.

Polymers capable of providing flame retardancy in the present invention are polycyclohexylenedimethylene terephthalate resins which are polyester-based thermoplastic resins having excellent moldability and heat resistance. Specifically, the polycyclohexylenedimethylene terephthalate resins may have a molecular weight of 15,000 to 30,000 and contain at least one repeating unit of Formula 2 below:

[Formula 2]

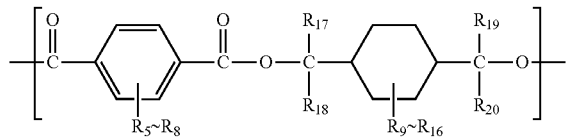

wherein $R_5$ to $R_{20}$ are independently H or $C_1$ to $C_6$ alkyl group. In particular, substituents of $R_5$ to $R_8$ and $R_9$ to $R_{16}$ refer to substituents linked to carbon constituting the aromatic ring and the alkyl ring, respectively.

More specifically, the polycyclohexylenedimethylene terephthalate resins may have a molecular weight of 15,000 to 30,000 and contain at least one repeating unit of Formula 3 below:

[Formula 3]

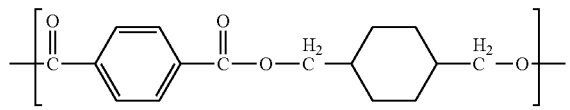

A repeating unit represented by Formula 3 corresponds to the case of Formula 2 in which $R_5$ to $R_{20}$ substituents are all H. It is the most basic and simplest form of a repeating unit and is known as a representative repeating unit of typical polycyclohexylenedimethylene terephthalate resins.

The present invention is based on discovery of the optimal flame retardant aid which may incorporate excellent flame retardancy as well as enhanced color resistance to polycyclohexylenedimethylene terephthalate resins, even when flame retardants are used in a small quantity.

Regarding polycyclohexylenedimethylene terephthalate resin compositions containing aluminum methyl methylphosphonate or phosphinic metallic salt compounds as a representative example of flame retardants, the present invention confirmed that flame retardancy and color resistance were enhanced or maintained when a flame retardant aid represented by Formula 1 was contained in both compositions compared to when a flame retardant aid was not contained.

[Formula 1]

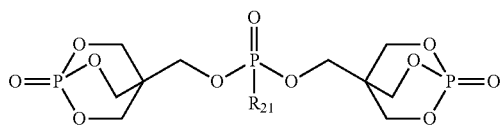

$R_{21}$ is a $C_1$ to $C_6$ linear or branched alkyl group, a $C_3$ to $C_6$ cyclic alkyl group, or a $C_6$ to $C_{10}$ aryl group, is preferably a $C_6$ to $C_{10}$ aryl group, and more preferably a phenyl group as represented by Formula 6 below:

[Formula 6]

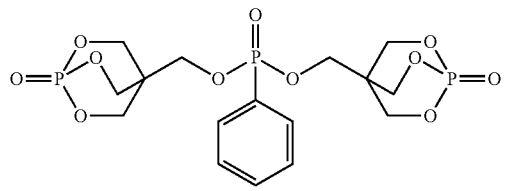

Specifically, by adding bis(2,6,7-trioxa-1-phosphabicyclo[2.2.2]octane-1-oxo-4-hydroxymethyl) phenylphosphonate in which $R_{21}$ is a phenyl group as the optimal flame retardant aid, a polycyclohexylenedimethylene terephthalate resin composition, which not only exhibits flame retardancy but also color resistance may be provided.

Therefore, regardless of the flame retardant contained therein, a polycyclohexylenedimethylene terephthalate resin composition with cost effectiveness, and excellent flame retardancy and color resistance may be prepared by including the flame retardant aid.

In the present invention, a flame retardant aid refers to a substance which may enhance flame retardancy by being contained in a resin composition in combination with a flame retardant. Because commercialized flame retardants are typically expensive, research has been conducted to develop flame retardant aids which maintain or enhance flame retardancy lowering the flame retardant content to produce economical resin compounds.

Conventionally, a flame retardant aid selected from the group consisting of aromatic phosphate-based compounds, nitrogen-containing compounds of melamine and melamine cyanurate, nitrogen-phosphorus-containing compounds of melamine pyrophosphate and melamine polyphosphate, and mixtures thereof is used. However, when a bis(2,6,7-trioxa-1-phosphabicyclo[2.2.2]octane-1-oxo-4-hydroxymethyl) phenylphosphonate compound is contained in a polycyclohexylenedimethylene terephthalate resin composition of the present invention as a flame retardant aid, excellent color resistance as well as enhanced flame retardancy was exhibited compared to the melamine-based compounds.

A flame retardant aid represented by Formula 1 may form an adiabatic expansion layer with a substance which may produce a phosphoric acid in an intumescent flame-retardant system enhances compatibility between polycyclohexylenedimethylene terephthalate resins of the present invention and a flame retardant and incorporated color resistance. The flame retardant aid may be contained in the amount of from 0.1 wt % to 50 wt % relative to the total polycyclohexylene-dimethyleneterephthalate resin composition of the present invention. If the flame retardant aid is contained in the amount in the amount less than 0.1 wt % to the total resin composition, there may be a problem of decreased flame retardancy, and if contained in the amount over 50 wt %, there may be a problem of reduced mechanical strength and being uneconomical.

In the present invention, besides a flame retardant aid represented by Formula at least one flame retardant aid among primary ammonium phospate, secondary ammonium phospate, ammonium phospite, amine/amide phosphate, amine sulfate, melamine phosphate, dimelamine phosphate, melamine pyrophosphate, melamine polyphosphate, tricrecyl phosphate, and trichloroalkyl phosphate may be contained.

A flame retardant used in the present invention may include any substance conventionally used as a flame retardant in the art and any substance enhance flame retardancy of resins.

Depending on types and characteristics of flame retardants, thermal properties and effects on flame retardancy are different. Depending on types of resins, flame retardants differ in the degree of incorporating flame retardancy, and thus it is preferable to choose a flame retardant according to types of resins.

A polycyclohexylenedimethylene terephthalate resin composition according to the present invention may contain the first flame retardant represented by Formula 4 and/or the second flame retardant represented by Formula 5 as flame retardants as follows:

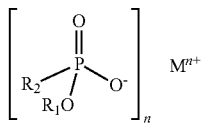

[Formula 4]

wherein n is an integer between 1 and 4;

$R_1$ and $R_2$ are each independently a $C_1$ to $C_6$ linear or branched alkyl group, a $C_3$ to $C_6$ cyclic alkyl group, a $C_1$ to $C_6$ linear or branched alkoxy group, a $C_6$ to $C_{10}$ aryl group, or a $C_6$ to $C_{10}$ aryloxy group; and M is an alkaline-earth metal, an alkali metal, zinc, aluminum, or iron.

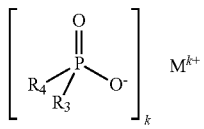

[Formula 5]

wherein k is an integer between 1 and 4;

$R_3$ and $R_4$ are each independently a $C_1$ to $C_6$ linear or branched alkyl group, a $C_3$ to $C_6$ cyclic alkyl group, a $C_1$ to $C_6$ linear or branched alkoxy group, a $C_6$ to $C_{10}$ aryl group, or a $C_6$ to $C_{10}$ aryloxy group; and M is an alkaline-earth metal, an alkali metal, zinc, aluminum, or iron.

To provide flame retardancy in resins, typical halogen-based or phosphate-based flame retardants have been generally used. However, when phosphonate metallic salts are used as a flame retardant according to the present invention, not only flame retardancy is incorporated, but color resistance is also incorporated to a polycyclohexylenedimethylene terephthalate resin composition, as well as playing a role in preventing reduction in tensile strength.

More specifically, the first flame retardant represented by Formula 4 in the present invention contains one more P—O bond compared to the second flame retardant represented by Formula 5 which is a phosphinic metallic salt. Thus, while the second flame retardant which is a phosphinic metallic salt can only incorporate flame retarancy to polycyclohexylenedimethylene terephthalate resins, the first flame retardant which is a phosphonate metallic salt can additionally incorporate color resistance to polycyclohexylenedimethylene terephthalate resins.

For example, the first flame retardant may be exemplified by aluminum methyl methylphosphonate which is represented by Formula 7 below:

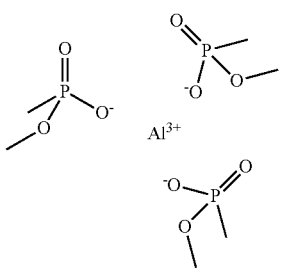

[Formula 7]

Further, the first flame retardant may be contained in the amount of from 0.1 wt % to 50 wt % relative to the total polycyclohexylenedimethylene terephthalate resin composition of the present invention. If the first flame retardant is contained in the amount less than 0.1 wt % relative to the total resin composition, there may be a problem of decreased flame retardancy, and if contained in the amount over 50 wt %, there may be a problem of reduced mechanical strength and being uneconomical.

In the embodiment of the present invention, when bis(2, 6,7-trioxa-1-phosphabicyclo[2.2.2]octane-1-oxo-4-hydroxymethyl)phenylphosphonate is added as a flame retardant aid, polycyclohexylenedimethylene terephthalate resins containing the first flame retardant exhibited superior flame retardancy and superior color resistance compared to resin compositions (i) not containing a flame retardant aid; or (ii) containing melamine cyanurate (MC) as a flame retardant aid. Therefore, it was observed that bis(2,6,7-trioxa-1-phosphabicyclo[2.2.2]octane-1-oxo-4-hydroxymethyl) Phenylphosphonate is an appropriate flame retardant aid for polycyclohexylenedimethylene terephthalate resins.

In the present invention, the polycyclohexylenedimethylene terephthalate resin composition may contain the second flame retardant represented by Formula 5 below:

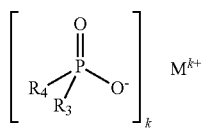

[Formula 5]

wherein k is an integer between 1 and 4;

$R_3$ and $R_4$ are each independently a $C_1$ to $C_6$ linear or branched alkyl group, a $C_3$ to $C_6$ cyclic alkyl group, a $C_1$ to $C_6$ linear or branched alkoxy group, a $C_6$ to $C_{10}$ aryl group, or a $C_6$ to $C_{10}$ aryloxy group; and M is an alkaline-earth metal, an alkali metal, zinc, aluminum, or iron.

The second flame retardant is a metal salt of phosphinic acid, and acts as a flame retardant as does the first flame, and further as protection against tensile strength reduction.

Examples of the second flame retardant (phosphinic metallic salt) without limitations are calcium dimethyl phosphinic acid, magnesium dimethylphosphinic acid, aluminum dimethylphosphinic acid, zinc dimethylphosphinic acid, calcium ethylmethylphosphinic acid, magnesium ethylmethylphosphinic acid, aluminum ethylmethylphosphinic acid, zinc ethylmethylphosphinic acid, calcium diethylphosphinic acid, magnesium diethylphosphinic acid, aluminum diethylphosphinic acid, zinc diethylphosphinic acid, calcium methyl-n-propylphosphinic acid, magnesium methyl-n-propylphosphinic acid, aluminum methyl-n-propylphosphinic acid, zinc methyl-n-propylphosphinic acid, calcium methanedi(methylphosphinic) acid, magnesium methanedi(methylphosphinic) acid, aluminum methanedi(methylphosphinic acid), zinc methanedi(methylphosphinic acid), calcium benzene-1,4-(dimethylphosphinic acid), magnesium benzene-1,4-(dimethylphosphinic acid), aluminum benzene-1,4-(dimethylphosphinic acid), zinc benzene-1,4-(dimethylphosphinic acid), calcium methylphenylphosphinic acid, magnesium methylphenylphosphinic acid, aluminum methylphenylphosphinic acid, zinc methylphenylphosphinic acid, calcium diphenylphosphinic acid, magnesium diphenylphosphinic acid, aluminum diphenylphosphinic acid, zinc diphenylphosphinic acid, etc. Preferably, the second flame retardant (phosphinic metallic salt) may be aluminum dimethylphosphinic acid, aluminum ethylmethylphosphinic acid, aluminum diethylphosphinic acid, and more preferably aluminum diethylphosphinic acid. Further, phosphinic metallic salt compounds may be easily purchased from the market. Examples of phosphinic metallic salt compounds that may be purchased from the market, without limitations, are of EXOLIT OP1230, OP1240, OP1311, OP1312, OP930, OP935, etc., which are products from Clariant. The second flame retardant according to the present invention may be selected from a group consisting of the exemplified phosphinic metallic salts and mixtures thereof.

When the second flame retardant is contained in a polycyclohexylenedimethylene terephthalate resin composition according to the present invention, it may be contained in the amount of from 0.1 wt % to 50 wt % relative to the total polycyclohexylenedimethylene terephthalate resin composition. When the second flame retardant is contained less than 0.1 wt % relative to the total resin composition, the effects of increasing flame retardancy may be negligible, whereas when the second flame retardant is contained more than 50 wt %, cost effectiveness.

In the present invention, the polycyclohexylenedimethylene terephthalate resin composition may contain at least one reinforcing material selected from a group consisting of glass fibers, carbon fibers, potassium titanate fibers, silicon carbide fibers, and wollastonite. More specifically, the reinforcing materials may form composite resins by compounding as 1 part by weight to 60 parts by weight relative to 100 parts by weight of polycyclohexylenedimethylene terephthalate resins.

Reinforcing materials such as the glass fiber are used to obtain high mechanical and thermal properties which could not be reached by raw resin materials. Depending on types and contents of reinforcing materials, mechanical properties of resin compositions and molded articles using such may be determined. Depending on the composition ratio, the glass fiber, an example of reinforcing materials, may be classified into three types: E, S, and C types. Glass fibers of E type are most widely used. For example, glass fibers of E type consist of about 55% of silica, about 20% of calcium oxide or magnesium, about 14% of alumina, about 10% of boron oxide, and about 1% of sodium oxide or potassium, etc. It may be preferable to use glass fibers as the reinforcing materials according to the present invention. The glass fibers are compounded with polycyclohexylenedimethylene terephthalate resins and form polycyclohexylenedimethylene terephthalate-glass fiber composite resins and thus provide a resin composition exhibiting superior mechanical properties.

In the present invention, the polycyclohexylenedimethylene terephthalate resin composition may further contain at least one additive selected form a group consisting of antioxidants, releasing agents, lubricants, compatibilizers, impact modifiers, plasticizers, nucleating agents, and colorants besides the mentioned components. The properties of a resin composition may be controlled by adding appropriate additives at suitable amounts by conventional methods in the art depending on the objective of one of ordinary skill in the art, without particular limitations.

A polycyclohexylenedimethylene terephthalate resin composition according to the present invention may be produced by conventional compounding processes. Thus, by simultaneously mixing components of the present invention and other additives, and undergoing compounding processes, a resin composition in the form of pellets may be produced.

Compounding refers to a process of producing resin compositions capable of molding processing such as extruding, injection, etc., by adding various additives, reinforcing materials, etc., to raw polymer materials. Examples of types of an unit operation process of compounding include a process of mixing additives (sedatives, lubricants, toning agents, fillers, flame retardants, etc.) to polymer resins and evenly mixing them; a process of acquiring needed mechanical properties by adding reinforcing materials such as glass fibers, carbon fibers, etc.; a process of acquiring desired properties by mixing two or more resins; a process of removing flammable substances; a process of making pellets; etc. At least one or two of the processes may be used irrespective of the order.

Compounding typically takes place when resins are in the molten state, and may be carried out at considerably high viscosity (typically, $10^2$ Pa·s to $10^5$ Pa·s) and temperature (100° C. to 400° C.), attributing to properties of the molten state. Therefore, depending on curing properties (thermosetting or thermoplastic properties) and viscoelastic properties (typical plastic or rubber types), etc., of used resins, processing conditions, as well as used apparatus, may somewhat differ. Therefore, compounding according to the present invention may be performed by one of ordinary skill in the art by properly choosing appropriate processing conditions and apparatus for polycyclohexylenedimethylene terephthalate resins.

In the embodiment of the present invention, compounding of the polycyclohexylenedimethylene terephthalate resins, glass fibers which is the first flame retardant, and optionally, the second flame retardant was performed at 280° C. to 300° C. using HAAKE PolyDrive R600 (Thermo Electron Corporation), but is not limited thereto.

A resin composition according to the present invention is fire-safe and environment-friendly, since it does not use halogen-based flame retardants which cause pollutions when combusted. Especially by containing flame retardant aids which maintain excellent flame retardancy and color resistance, the content of expensive flame retardants may be reduced, and thus an economical resin composition may be provided.

In addition, the present invention provides flame-retardant molded articles using a polycyclohexylenedimethylene terephthalate resin composition according to the present invention.

In particular, a resin composition according to the present invention may be used in different types of molded articles depending on various processing such as injection molding, blow molding, extrusion, thermoforming, etc. Especially due to excellent heat resistance, mechanical strength, mechinability, environment-friendly flame-retardant properties and color resistance, it may be used in various electrical and electronic components including display, and automobile parts and interior materials. For example, it may be used in molding resins for LED reflecting plate or LCD BLU (LCD Backlight Unit).

A polycyclohexylenedimethylene terephthalate resin composition according to the present invention contains bis(2,6,7-trioxa-1-phosphabicyclo[2.2.2]octane-1-oxo-4-hydroxymethyl) phenylphosphonate as the optimal flame retardant aid, thus is economical, excellent in flame retardancy and color resistance, and environment-friendly since it does not contain halogen compounds which cause pollutions when combusted. Further, flame-retardant molded articles using features of the resin composition according to the present invention may be used in electrical and electronic components such as display, or as automobile parts.

Hereinafter, the present invention will be illustrated in greater detail with reference to Examples. Examples are for illustrative purposes and shall not be understood as limiting the scope of the present invention.

Components of a polycyclohexylenedimethylene terephthalate resin composition according to the present invention were prepared as follows:

(A) Polycyclohexylenedimethylene Terephthalate Resins and Polycyclohexylenedimethylene Terephthalate-glass Fiber (GF) Composite Resins Polycyclohexylenedimethylene terephthalate resins from SK Chemical Company (Product name: Puratan, molecular weight: 20,000) were used.

Further, polycyclohexylenedimethylene terephthalate resin-GF composite resins were prepared by compounding 20 parts by weight to 60 parts by weights of glass fibers (GF) relative to 100 parts by weights of the polycyclohexylenedimethylene terephthalate resins.

(B) Non-halogen Flame Retardant Organic Phosphinate

Organic phosphinate from Clariant (Product name: Exolit OP 1240) was used.

(C) Non-halogen Flame Retardant Aid bis(2,6,7-trioxa-1-phosphabicyclo[2.2.2]octane-1-oxo-4-hydroxymethyl)phenylphosphonate (Product name: Bis-PP) was used by synthesizing phosphorux (V) oxychloride ($POCl_3$), pentaerythritol (PER), and phenylphosphonic dichloride (PPDC).

(D) Aluminum Methyl Methylphosphonate

Aluminum methyl methylphosphonate (Product name: MMPAL), one of flame retardants of the present invention, was synthesized by reacting dimethyl methylphosphonate, barium hydroxide, aluminum nitrate, sulfuric acid, and isopropanol.

More specifically, water-soluble alkali salts of dimethyl methylphosphonate (DMMP) were first obtained using strong acid $Ba(OH)_2$ and sulfuric acid. Further, by adding a water-soluble aluminum salt, $Al(NO_3)_3$, thereto, insoluble aluminum methyl methylphosphonate was synthesized. Then, after repeated filtering and washing using 2-propanol and distilled water, distilled aluminum methyl methylphosphonate at high purity was obtained by removing the unreacted. The synthesis reaction is illustrated in Reaction Scheme 1 as follows:

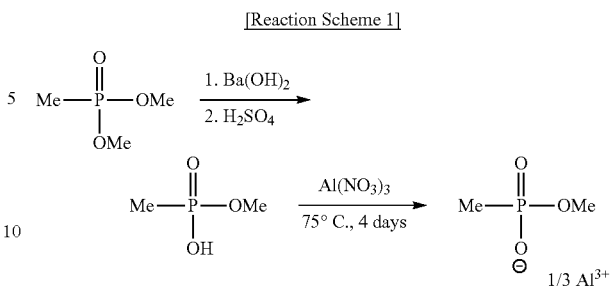

[Reaction Scheme 1]

(E) Non-halogen Flame Retardant Aids—Phosphorus-based Melamine or Ammonium Compounds As phosphorus-based melamine or ammonium compounds, melamine cyanurate of Do boon Inc. (Product name: Nonfla MC600) was used.

COMPARATIVE EXAMPLES 1 to 8

Polycyclohexylenedimethylene Terephthalate Resin Compositions not Containing Bis-PP Flame Retardant Aids (A) polycyclohexylenedimethylene terephthalate-GF composite resins and optionally, (B) non-halogen flame retardant Organic phosphinate, were compounded at different composition ratios according to Table 1 (Comparative Example 1 to 4). Also, specimens were prepared by compounding (A) polycyclohexylenedimethylene terephthalate-GF composite resins and optionally, (D) aluminum methyl methylphosphonate and (E) non-halogen flame retardant aid melamine cyanurate (MC) at composition ratios according to Table 1 and 2 (Comparative Example 5 to 8). Such compounding was performed at 280° C. to 300° C. using HAAKE PolyDrive R600 of Thermo Electron Corporation.

EXAMPLES 1 to 7

Polycyclohexylenedimethylene Terephthalate Resin Composition Containing Bis-PP Flame Retardant Aids Specimens of Example 1 to 7 were prepared by compounding (A) polycyclohexylenedimethylene terephthalate-GF composite resins, (B) non-halogen flame retardant Organic phosphinate, or (D) non-halogen flame retardant aluminum methyl methylphosphonate, and optionally (C) non-halogen flame retardant aid Bis-PP at composition ratios according to Table and Table 2. Such compounding was performed at 280° C. to 300° C. using HAAKE PolyDrive 8600 of Thermo Electron Corporation.

EXPERIMENTAL EXAMPLE 1

Flame Retardancy Evaluation Experiment

Specimens according to Example 1 to 5 and Comparative Example 1 to 6 were each measured for flame retardancy at ⅛" thickness according to UL-94 VB flame retardancy standards. Measured flame retardancy results are shown in Table 1.

TABLE 1

| | Comparative Example | | | | | | Example | | | | |
|---|---|---|---|---|---|---|---|---|---|---|---|
| | 1 | 2 | 3 | 4 | 5 | 6 | 1 | 2 | 3 | 4 | 5 |
| (A) PCT | 100 | 93 | 92 | 91 | 81 | 80 | 88 | 87 | 86 | 88 | 87 |
| (B) OP | | 7 | 8 | 9 | | | 5 | 5 | 5 | | |
| (C) Bis-PP | | | | | | | 7 | 8 | 9 | 7 | 8 |
| (D) MMPAL | | | | | 12 | 12 | | | | 5 | 5 |
| (E) MC | | | | | 7 | 8 | | | | | |
| UL-94 Flame retardancy (1/8") | NR | NR | V-1 | V-0 | V-1 | V-U | V-2 | V-1 | V-0 | V-1 | V-0 |

*NR (No Rating): classifications other than V-0 to V-2

Generally, flame retardancy may be classified into V-0, V-1, and V-2 according to UL-94 flame retardancy standards, and flame-retardancy increases from V-2 to V-0.

As shown in Table 1, it was confirmed that as the content of (C) Bis-PP, the flame retardant aid according to the present invention, increases, flame retardancy increases (Example 1 to 3). Also, by containing a Bis-PP flame retardant aid while containing (B) non-halogen flame retardant Organic phosphinate in a small amount, equivalent or superior flame retardancy was confirmed (Comparative Example 1 to 3, Example 1 to 3).

In addition, compared to when (D) non-halogen flame retardant aluminum methyl methylphosphonate and (E) non-halogen flame retardant aid melamine cyanurate (MC) are contained (Comparative Example 5 and 6), when (C) Bis-PP, the flame retardant aid according to the present invention contained, a composition exhibited equivalent or superior flame retardancy with even lower contents (Comparative Example 5 and 6, Example 4 and 5). Thus, more economical application of a resin composition is possible when a flame retardant aid (C) Bis-PP is contained. Further, a resin composition according to Example 1 to 5 does not contain halogen compounds which cause pollutions when combusted, thus having an advantageous of being environment-friendly.

EXPERIMENTAL EXAMPLE 2

Color Resistance (Color Difference) Evaluation Experiment

Regarding specimens according to Example 6 and 7, and Comparative Example 1, 3, 7, and 8, color differences were measured before and after being emerged in water at 100° C. (humidity 100%), which is a isothermal-isohumid condition, for 48 hours using Datacolor 650 of Datacolor, Switzerland, and color resistance was evaluated. Color differences before and after the experiment were measured as an L-value and a b-value. Measured results are shown in Table 2.

TABLE 2

| | Comparative Example | | | | | | | | | | | | | | | |
|---|---|---|---|---|---|---|---|---|---|---|---|---|---|---|---|---|
| | 1 | | | | 3 | | | | 7 | | | | 8 | | | |
| (A) PCT | 100 | | | | 92 | | | | 83 | | | | 83 | | | |
| (B) OP | | | | | 8 | | | | | | | | | | | |
| (C) Bis-pp | | | | | | | | | | | | | | | | |
| (D) MMPAL | | | | | | | | | 17 | | | | 6 | | | |
| (E) MC | | | | | | | | | | | | | 11 | | | |
| Color Data | L | | b | | L | | b | | L | | b | | L | | b | |
| | before | after | before | after | before | after | before | after | before | after | before | after | before | after | before | after |
| | 90.8 | 90.4 | 4.6 | 4.7 | 84.6 | 82.6 | 6.8 | 6.9 | 86.4 | 85.9 | 5.8 | 7.3 | 91.5 | 90.9 | 3.8 | 4.1 |

| | Example | | | | | | | |
|---|---|---|---|---|---|---|---|---|
| | 6 | | | | 7 | | | |
| (A) PCT | 83 | | | | 83 | | | |
| (B) OP | 6 | | | | | | | |
| (C) Bis-pp | 11 | | | | 11 | | | |
| (D) MMPAL | | | | | 6 | | | |
| (E) MC | | | | | | | | |
| Color Data | L | | b | | L | | b | |
| | before | after | before | after | before | after | before | after |
| | 90.68 | 90.49 | 5.18 | 6.47 | 91.3 | 90.7 | 4.5 | 4.7 |

Regarding polymer resins, chromaticity becomes superior when a color index L-value is 90 or higher, and a color index b-value is 10 or less.

Chromaticity and color resistance were compared according to the presence of Bis-PP as a flame retardant aid.

First, when (B) non-halogen flame retardant Organic phosphinate is contained, Comparative Example 3 and Example 6 which respectively does not contain and contains flame retardant aid Bis-PP were compared. Before the experiment, the L-value was higher in Example 6 compared to Comparative Example 6 (90.68>84.6), and the b-value was higher in Example 6 compared to Comparative Example 3 (5.18<6.8). Further, after being emerged in water at 100° C. for 48 hours, compared to Comparative Example 3, Example 6 still had a higher L-value (90.49>82.6), and a lower b-value (6.47<6.9). Thus, it is observed that Example 6 exhibits superior chromaticity and color resistance compared to Comparative Example 3. This suggests that chromaticity and color resistance may be increased in resin compositions by containing the flame retardant aid Bis-PP in Example 6.

Next, when containing (D) non-halogen flame retardant aluminum methyl methylphosphonate, Comparative Example 7 and Example 7 which respectively does not contain and contains flame retardant aid Bis-PP were compared.

Before the experiment, the L-value was higher in Example 7 compared to Comparative Example 7 (91.3>86.4), and the b-value was higher in Example 7 compared to Comparative Example 7 (4.5<5.8). Further, after being emerged in water at 100° C. for 48 hours, compared to Comparative Example 7, Example 7 still had a higher L-value (90.7>85.9), and a lower b-value (4.7<7.3). Thus, it was observed that Example 7 exhibits superior chromaticity and color resistance compared to Comparative Example 7. This suggests that chromaticity and color resistance may be increased in resin compositions by containing the flame retardant aid Bis-PP in Example 7.

What is claimed is:

1. A resin composition comprising:
(a) a resin comprising at least one repeating unit of Formula 2 below:

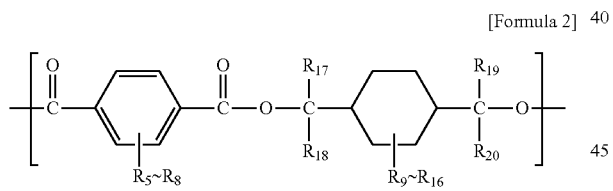

[Formula 2]

wherein $R_5$ to $R_{20}$ is independently H or $C_1$ to $C_6$ alkyl group;
(b) a flame retardant; and
(c) a flame retardant aid represented by Formula 1 below:

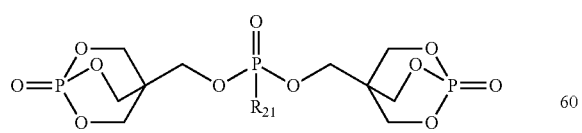

[Formula 1]

wherein $R_{21}$ is a $C_5$ to $C_6$ cyclic alkyl group or a $C_6$ to $C_{10}$ aryl group.

2. The resin composition according to claim 1, wherein the repeating unit is that of Formula 3 below:

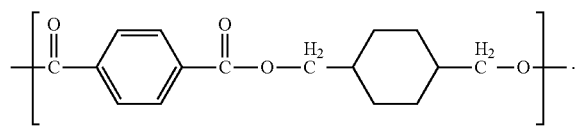

[Formula 3]

3. The resin composition according to claim 1, wherein the flame retardant is a first flame retardant represented by Formula 4 below, or a second flame retardant represented by Formula 5 below,

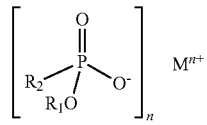

[Formula 4]

wherein
n is an integer between 1 and 4;
$R_1$ and $R_2$ are each independently a $C_1$ to $C_6$ linear or branched alkyl group, a $C_3$ to $C_6$ cyclic alkyl group, a $C_1$ to $C_6$ linear or branched alkoxy group, a $C_6$ to $C_{10}$ aryl group, or a $C_6$ to $C_{10}$ aryloxy group; and
M is an alkaline-earth metal, an alkali metal, zinc, aluminum, or iron

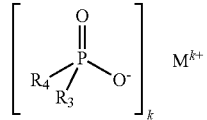

[Formula 5]

wherein k is an integer between 1 and 4;
$R_3$ and $R_4$ are each independently a $C_1$ to $C_6$ linear or branched alkyl group, a $C_3$ to $C_6$ cyclic alkyl group, a $C_1$ to $C_6$ linear or branched alkoxy group, a $C_6$ to $C_{10}$ aryl group, or a $C_6$ to $C_{10}$ aryloxy group; and
M is an alkaline-earth metal, an alkali metal, zinc, aluminum, or iron.

4. The resin composition according to claim 1, wherein the flame retardant aid is represented by Formula 6 below:

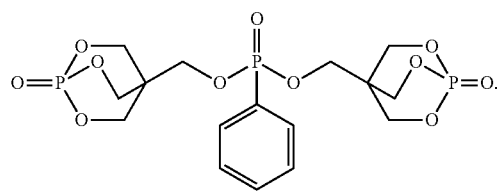

[Formula 6]

5. The resin composition according to claim 1, wherein the flame retardant aid is contained in the amount of from 0.1 wt % to 50 wt % relative to the total resin composition.

6. The resin composition according to claim 3, wherein the second flame retardant is contained in the amount of from 0.1 wt % to 50 wt % relative to the total resin composition.

7. The resin composition according to claim 3, wherein the first flame retardant represented by Formula 4 is aluminum methyl methylphosphonate.

8. The resin composition according to claim 3, wherein the second flame retardant represented by Formula 5 is selected from the group consisting of aluminum dimethylphosphinic acids, aluminum ethylmethylphosphinic acids, aluminum diethylphosphinic acids and mixtures thereof.

9. The resin composition according to claim 1, further comprising at least one reinforcing material selected from the group consisting of glass fibers, carbon fibers, potassium titanate fibers, silicon carbide fibers, and wollastonite.

10. The resin composition according to claim 9, wherein the reinforcing material is present in 1 part by weight to 60 parts by weight of the reinforcing material relative to 100 parts by weight of the resin.

11. The resin composition according to claim 1, further comprising at least one additive selected from the group consisting of antioxidants, releasing agents, lubricants, compatibilizers, impact modifiers, plasticizers, nucleating agents and colorants.

12. A flame-retardant molded article prepared using the resin composition according to claim 1.

13. The flame-retardant molded article according to claim 12, wherein the flame-retardant molded article is an LED reflecting plate or a molded resin for LCD backlight unit.

14. The flame-retardant molded article according to claim 12, wherein the repeating unit is that of Formula 3 below:

[Formula 3]

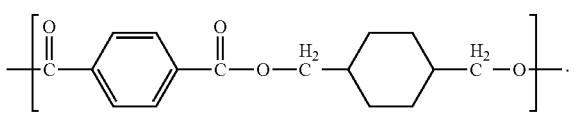

15. The flame-retardant molded article according to claim 12, wherein the flame retardant is a first flame retardant represented by Formula 4 below, or a second flame retardant represented by Formula 5 below,

[Formula 4]

wherein
n is an integer between 1 and 4;
$R_1$ and $R_2$ are each independently a $C_1$ to $C_6$ linear or branched alkyl group, a $C_3$ to $C_6$ cyclic alkyl group, a $C_1$ to $C_6$ linear or branched alkoxy group, a $C_6$ to $C_{10}$ aryl group, or a $C_6$ to $C_{10}$ aryloxy group; and
M is an alkaline-earth metal, an alkali metal, zinc, aluminum, or iron

[Formula 5]

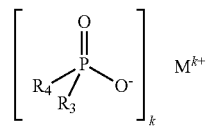

wherein k is an integer between 1 and 4;
$R_3$ and $R_4$ are each independently a $C_1$ to $C_6$ linear or branched alkyl group, a $C_3$ to $C_6$ cyclic alkyl group, a $C_1$ to $C_6$ linear or branched alkoxy group, a $C_6$ to $C_{10}$ aryl group, or a $C_6$ to $C_{10}$ aryloxy group; and
M is an alkaline-earth metal, an alkali metal, zinc, aluminum, or iron.

16. The flame-retardant molded article according to claim 12, wherein the flame retardant aid is represented by Formula 6 below:

[Formula 6]

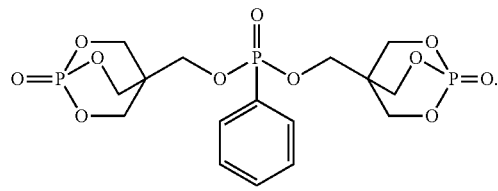

17. The flame-retardant molded article according to claim 12, further comprising at least one reinforcing material selected from the group consisting of glass fibers, carbon fibers, potassium titanate fibers, silicon carbide fibers, and wollastonite.

18. The flame-retardant molded article according to claim 12, further comprising at least one additive selected from the group consisting of antioxidants, releasing agents, lubricants, compatibilizers, impact modifiers, plasticizers, nucleating agents and colorants.

* * * * *